US012638653B2

(12) United States Patent
Drzymala et al.

(10) Patent No.: US 12,638,653 B2
(45) Date of Patent: May 26, 2026

(54) OPTICAL ASSEMBLIES AND METHODS OF FORMING THE SAME WITH LIGHT-CURABLE ADHESIVE

(71) Applicant: ZEBRA TECHNOLOGIES CORPORATION, Lincolnshire, IL (US)

(72) Inventors: Mark Drzymala, Saint James, NY (US); Bryan E. Joles, Selden, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 562 days.

(21) Appl. No.: 17/147,265

(22) Filed: Jan. 12, 2021

(65) Prior Publication Data

US 2022/0221683 A1     Jul. 14, 2022

(51) Int. Cl.
G02B 7/02 (2021.01)

(52) U.S. Cl.
CPC ............. G02B 7/022 (2013.01); G02B 7/021 (2013.01); G02B 7/025 (2013.01)

(58) Field of Classification Search
CPC .......... G02B 7/021; G02B 7/025; G02B 7/02; G02B 7/08; G02B 7/005; G03B 17/12; G03B 17/02; H04N 23/50; H04N 23/54; H04N 23/51; H04N 23/55
See application file for complete search history.

(56) References Cited

U.S. PATENT DOCUMENTS 9,451,138 B2 * 9/2016 Winden ................. H04N 23/55
2010/0267049 A1 10/2010 Rutter et al.

2012/0045618 A1 * 2/2012 Yamazaki ................. G01J 3/26
156/182
2013/0063655 A1 * 3/2013 Hsu ......................... H04N 23/55
156/303.1
2013/0292477 A1 * 11/2013 Hennick ................ G06K 7/109
235/469
2013/0335711 A1 * 12/2013 Rozynski ................ H01S 3/005
353/31
2015/0138436 A1 * 5/2015 Wong ................ H01L 27/14683
348/374
2017/0230550 A1 * 8/2017 Leong .................... G02B 7/004
(Continued)

FOREIGN PATENT DOCUMENTS

DE       102016000217 A1 * 7/2017 ............ F16B 11/006
WO        2010111465 A1    9/2010

OTHER PUBLICATIONS

International Search Report and Written Opinion for International Application No. PCT/US2022/011835 mailed on Apr. 4, 2022.

*Primary Examiner* — Ephrem Z Mebrahtu

(57) ABSTRACT

Optical assemblies and methods of forming the same with light-curable adhesive are disclosed. An example method of assembling an optical assembly includes coupling a lens assembly with a lens assembly holder to form a lens sub-assembly, and applying a light-curable adhesive to a lens chassis fixedly mounted to a printed circuit board (PCB). The method may include optically aligning the lens sub-assembly with an image sensor fixedly mounted to the PCB. When optical alignment is complete, the method may include substantially curing the adhesive with light to fixedly mount the lens sub-assembly to the lens chassis to hold the lens assembly in a fixed optical alignment with the image sensor.

18 Claims, 5 Drawing Sheets

(56)  References Cited

U.S. PATENT DOCUMENTS

| | | | |
|---|---|---|---|
| 2018/0205857 A1* | 7/2018 | Chan | G02B 13/0085 |
| 2019/0052782 A1* | 2/2019 | Sung | G03B 17/12 |
| 2020/0147803 A1 | 5/2020 | Beach | |
| 2020/0202091 A1* | 6/2020 | Wilfred | G06K 7/1096 |
| 2020/0296262 A1 | 9/2020 | Winden et al. | |
| 2021/0048595 A1* | 2/2021 | Chu | G02B 7/025 |
| 2021/0103119 A1* | 4/2021 | Reckker | H04N 23/55 |
| 2021/0144281 A1* | 5/2021 | Deng | H04N 23/54 |
| 2021/0278622 A1* | 9/2021 | Liu | G02B 1/04 |
| 2021/0341703 A1* | 11/2021 | Jiang | G02B 7/025 |

* cited by examiner

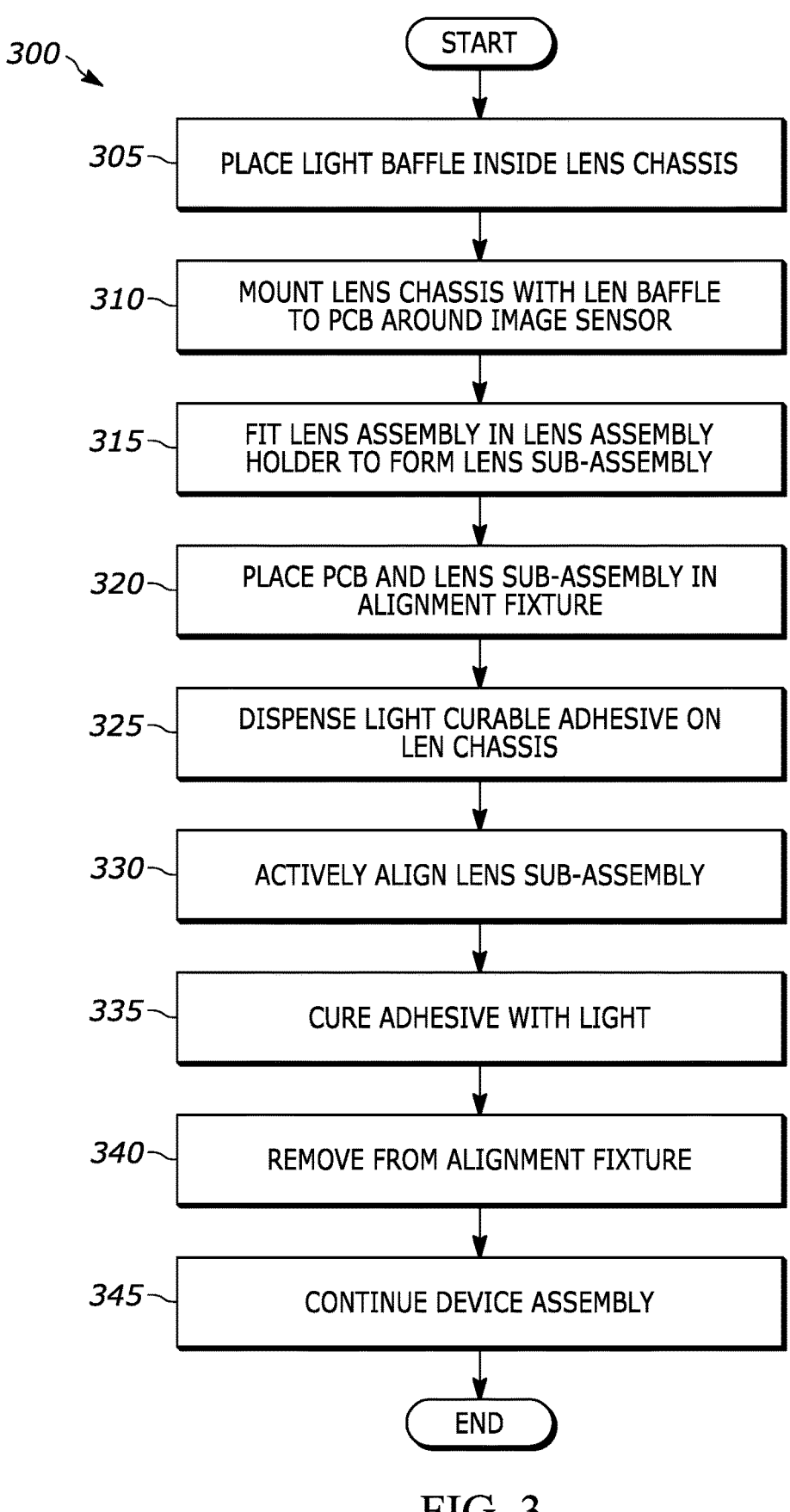

*300*

START

305 — PLACE LIGHT BAFFLE INSIDE LENS CHASSIS

310 — MOUNT LENS CHASSIS WITH LEN BAFFLE TO PCB AROUND IMAGE SENSOR

315 — FIT LENS ASSEMBLY IN LENS ASSEMBLY HOLDER TO FORM LENS SUB-ASSEMBLY

320 — PLACE PCB AND LENS SUB-ASSEMBLY IN ALIGNMENT FIXTURE

325 — DISPENSE LIGHT CURABLE ADHESIVE ON LEN CHASSIS

330 — ACTIVELY ALIGN LENS SUB-ASSEMBLY

335 — CURE ADHESIVE WITH LIGHT

340 — REMOVE FROM ALIGNMENT FIXTURE

345 — CONTINUE DEVICE ASSEMBLY

END

FIG. 3

OPTICAL ASSEMBLIES AND METHODS OF FORMING THE SAME WITH LIGHT-CURABLE ADHESIVE

BACKGROUND

Imaging devices (e.g., a camera) capture images of objects within a given field of view (FOV). It is often required that machine vision devices, barcode readers, etc. capture images with resolution sufficient at suitable distances for effective decoding of indicia captured in an image for use in, e.g., machine vision applications, barcode decoding, etc.

Capturing a clear, undistorted image requires an image device (e.g., a camera) with a carefully assembled and aligned lens assembly and image sensor. The lens assembly and image sensor need to be carefully aligned so the focus of the optical path of the lens assembly is centered on and perpendicular to the image sensor. For cameras with a fixed lens assembly, these alignments can take place during manufacturing and assembly, where production equipment can be set up to meet design specifications. However, in practice, high-volume manufacturing processes aren't perfect and can result in out of specification cameras, thereby resulting in expensive scrap or, worse, an unhappy customer.

SUMMARY

Active alignment processes may be used, during manufacture, to dynamically adjust lens assembly and image sensor positioning based on actual camera performance. Images are captured by the image sensor while the position of the lens assembly is dynamically adjusted relative to the image sensor (e.g., in five or six degrees of freedom) until captured images reflect an intended optical alignment of the lens assembly and image sensor. An adhesive is used to hold the lens assembly in this aligned position relative to the image sensor.

Conventionally, the lens assembly holder that holds a lens assembly in alignment with an image sensor is made of an opaque material to help prevent extraneous light from reaching the image sensor. However, because the lens assembly holder is opaque, the adhesive used to hold the lens assembly holder and the lens assembly it holds in alignment with the image sensor is shadowed by the lens assembly holder. Accordingly, the adhesive cannot be fully cured with light. Therefore, light can only be used to temporarily tack cure the lens assembly holder in place, and substantially full curing of the adhesive with heat is required. Thus, an oven is required to cure the adhesive. However, the use of an oven to cure the adhesive can, for example, be expensive, consume a lot of assembly line floor space, slow and/or disruptive to the continuous flow normally found on an assembly line, especially for larger products.

Thus, there is a need for optical assemblies and methods of forming the same with light-curable adhesive. Accordingly, the present application discloses lens assembly holders formed of a light transmissive material (e.g., material through which light can pass substantially unimpeded) such that the adhesive is no longer shadowed by the lens assembly holder. Therefore, the lens assembly holder does not prevent light from reaching the adhesive. Thus, the adhesive can be light-curable adhesive, i.e., the adhesive can be substantially cured with just light (e.g., UV light). However, because disclosed lens assembly holders are made of a light transmissive material they may allow extraneous light to reach the image sensor. Thus, in disclosed examples, a light baffle made of an opaque material may be used to seal against the end of the lens assembly to help prevent extraneous light from reaching the image sensor via the end of the lens assembly. Because, in disclosed examples, the bead of the adhesive can be substantially cured with light, the use of ovens, their associated costs, operating expenses, their footprint on assembly lines, their associated additional manufacturing steps, etc. can be eliminated.

In an embodiment, a method of assembling an optical assembly may include coupling a lens assembly with a lens assembly holder to form a lens sub-assembly, and applying a light-curable adhesive to a lens chassis fixedly mounted to a printed circuit board (PCB). The method may include optically aligning the lens sub-assembly with an image sensor fixedly mounted to the PCB. When optical alignment is complete, the method may include substantially curing the adhesive with light to fixedly mount the lens sub-assembly to the lens chassis to hold the lens assembly in a fixed optical alignment with the image sensor.

In one or more variations of the current embodiment, the lens assembly holder is formed of a light transmissive material, and the method may further comprise passing light external to the lens assembly holder through the lens assembly holder after the optical alignment is complete to cure the light-curable adhesive.

In one or more variations of the current embodiment, the light is an ultraviolet light and the lens assembly holder is formed of an ultraviolet light transmissive plastic material.

In one or more variations of the current embodiment, coupling the lens assembly with the lens assembly holder may include press fitting the lens assembly at least partially into the lens assembly holder.

In one or more variations of the current embodiment, coupling the lens assembly with the lens assembly holder may include threadably inserting the lens assembly at least partially into the lens assembly holder.

In one or more variations of the current embodiment, coupling the lens assembly with the lens assembly holder may include adhering the lens assembly to the lens assembly holder.

In one or more variations of the current embodiment, the method may further comprise soldering the image sensor to the PCB, mounting a light baffle to the PCB around the image sensor, and fixedly mounting the lens chassis to the PCB around the light baffle.

In one or more variations of the current embodiment, an end of the light baffle opposite the image sensor may seal against an end the lens sub-assembly.

In one or more variations of the current embodiment, the method may further comprise soldering a controller to the PCB, wherein the controller may be configured to decode indicia captured in images formed at the image sensor and convey decoded indicia payloads to a host system.

In another embodiment, an assembly includes an optical assembly that includes a lens chassis fixedly mounted to a printed circuit board (PCB), and an image sensor fixedly mounted to the PCB. The optical assembly may include a lens sub-assembly including a light transmissive lens assembly holder mated with a lens assembly. The optical assembly may include a substantially light-curable adhesive between a surface of the lens chassis and the lens sub-assembly to hold the lens assembly in a fixed optical alignment with the image sensor.

In one or more variations of the current embodiment, the assembly further comprises a housing. The optical assembly may be positioned at least partially within the housing. The assembly may include a barcode decoder disposed in the housing and configured to decode indicia captured in images formed at the image sensor.

In one or more variations of the current embodiment, the assembly may comprise a barcode reader.

In one or more variations of the current embodiment, the lens assembly holder may be formed of a light transmissive material configured to pass light external to the lens assembly holder through the lens assembly holder to cure the light-curable adhesive.

In one or more variations of the current embodiment, the light may be ultraviolet light and the lens assembly holder may be formed of an ultraviolet light transmissive plastic material.

In one or more variations of the current embodiment, the lens assembly may be press fit at least partially into the lens assembly holder.

In one or more variations of the current embodiment, the lens assembly may be threaded at least partially into the lens assembly holder.

In one or more variations of the current embodiment, the lens assembly may be adhered to the lens assembly holder.

In one or more variations of the current embodiment, the optical assembly may further include a light baffle mounted to the PCB around the image sensor, wherein the image sensor may be fixedly soldered to the PCB beneath the light baffle, and the lens chassis may be fixedly adhered to the PCB around the light baffle.

In one or more variations of the current embodiment, an end of the light baffle opposite the image sensor may seal against an end the lens sub-assembly.

In one or more variations of the current embodiment, the image sensor may include an interface to communicate images to a controller. The controller may be fixedly soldered to the PCB, and may be configured to decode indicia captured in the images and convey decoded indicia payloads to a host system.

BRIEF DESCRIPTION OF THE DRAWINGS

In the accompanying figures, like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

FIG. 3 is a flowchart representative of example methods, hardware logic and/or machine-readable instructions for assembling an optical assembly, such as the example optical assembly of FIGS. 1 and 2.

Figure 1:
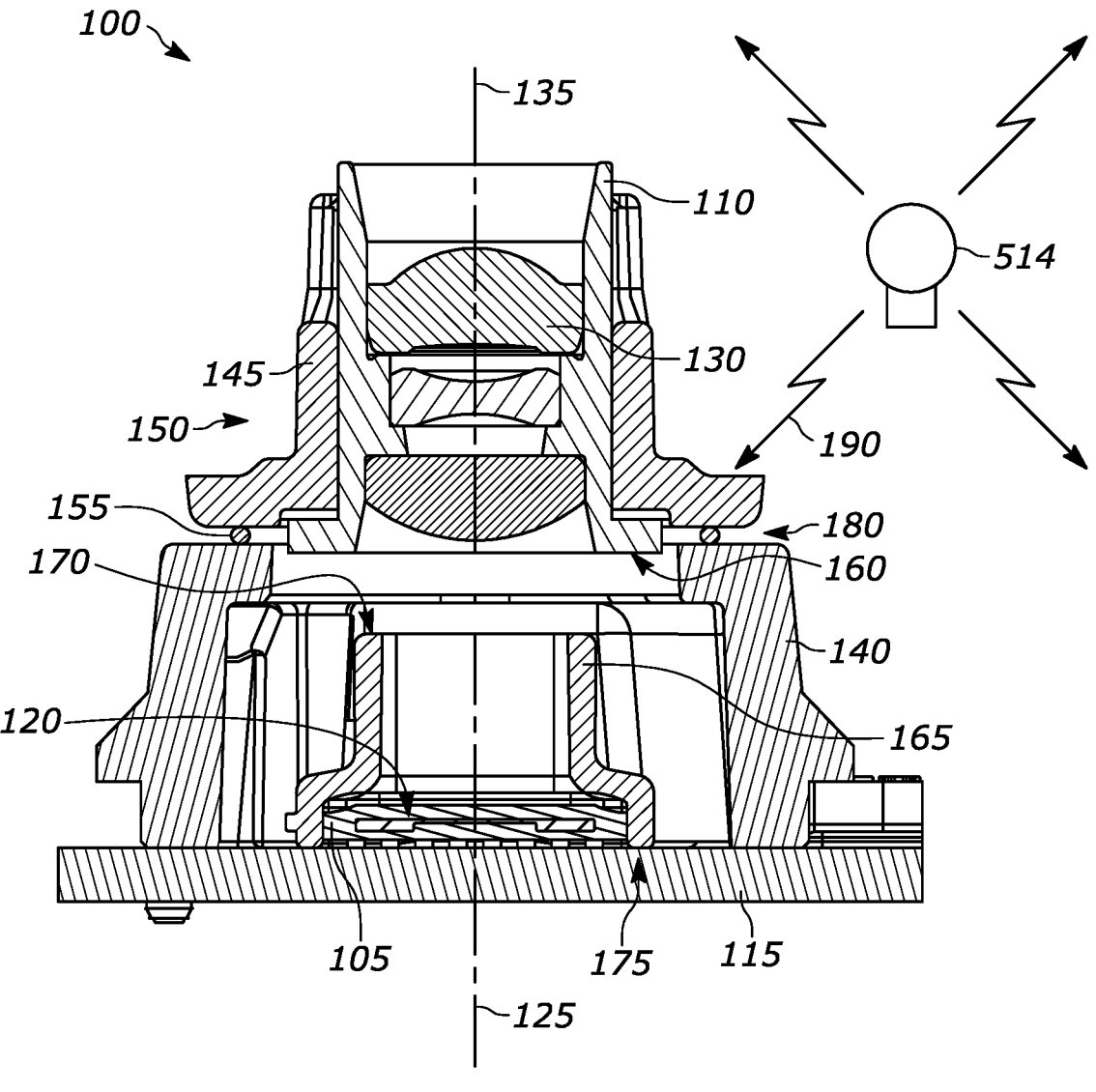
FIG. 1 is a side cross sectional view of an example optical assembly, in accordance with this disclosure.

Skilled artisans will appreciate that elements in the figures are illustrated for simplicity and clarity and may not have necessarily been drawn to scale. For example, the dimensions of some of the elements in the figures may be exaggerated relative to other elements to help to improve understanding of examples of the invention.

The assembly and method components have been represented where appropriate by conventional symbols in the drawings, showing only those specific details that are pertinent to understanding the examples of the invention so as not to obscure the disclosure with details that will be readily apparent to those of ordinary skill in the art having the benefit of the description herein. Skilled artisans will readily recognize from the following discussion that alternate examples of the assemblies and methods illustrated herein may be employed without departing from the principles set forth herein.

DETAILED DESCRIPTION

Reference will now be made in detail to non-limiting examples, some of which are illustrated in the accompanying drawings.

Figure 2:
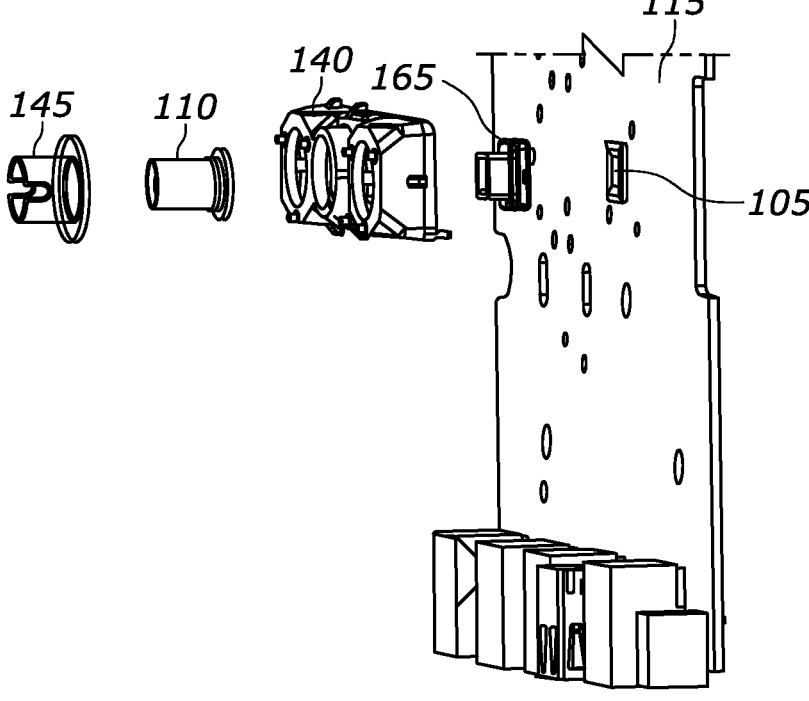
FIG. 2 is an exploded perspective view of the optical assembly of FIG. 1.

A side cross sectional view of an example optical assembly 100, in accordance with this disclosure, is shown in FIG. 1. FIG. 2 is an exploded view of the optical assembly 100 of FIG. 1. The optical assembly 100 may be used to implement, for example, a camera for capturing images for any number of systems and devices including, but not limited to, machine vision systems, barcode readers, direct part marking (DPM) readers, etc.

To capture images, the optical assembly 100 includes an example image sensor 105 and an example lens assembly 110. The image sensor 105 is configured to receive an image of a target object in a field of view (FOV) of the optical assembly 100 via the lens assembly 110, and to generate an electrical signal (i.e., an image frame) representative of the image of an environment appearing within a field of view, which may include a target. In the illustrated example of FIG. 1, the image sensor 105 is fixedly, mechanically and/or electrically soldered to a printed circuit board (PCB) 115. The PCB 115 is configured to, among other things, control the image sensor 105 to capture image frames. The PCB 115 may include additional components such as a controller (e.g., one or more generic or specialized processors such as microprocessors, digital signal processors (DSPs), customized processors, field programmable gate arrays (FPGAs), etc.) to control when to activate the image sensor 105 to capture image frames, decode indicia and/or markings captured in images formed at the image sensor 105, convey decoded indicia payloads to a host system, etc. Additionally, the PCB 115 may include one or more tangible, non-transitory storage memories and/or storage devices for storing the image frame, computer readable instructions for controlling the image sensor 105 and/or, more generally, operations of the PCB 115 or a device that includes the PCB 115, etc. The PCB 115 may further include a communications module, input/output devices and/or ports for communicating with external systems, devices and networks. In some examples, fixedly coupled, affixed, etc. refers to two components being physically coupled and ready for their intended end use, and not intended for decoupling.

In embodiments, the optical assembly 100 may be included in a device (not shown in the illustration for clarity) implemented in housing, such as a machine vision device, barcode reader, etc. that includes additional elements, or may be adapted to be inserted into a docking station with additional elements such as an AC power source to provide power for the device, or another computational device, external network, or communications module for communicating between the device and external devices and systems. The device may further include an onboard power supply such as a battery configured to supply power to the PCB 115. Additionally, the device may include a memory and a controller that controls operation of the device. In embodiments, the device may include a trigger (not shown in the illustration) that is used to activate the optical assembly 100 to capture an image. The device may include any number of additional components such as a barcode decoder to decode indicia in captured images, decoding systems, processors, and/or circuitry coupled to the PCB 115, and/or any other circuitry and circuit boards to assist in operation of the device.

The image sensor 105 includes a plurality of photosensitive elements forming a substantially flat surface 120. The image sensor 105 has a defined central imaging axis 125 that is normal to the substantially flat surface 120 formed by the photosensitive elements.

The lens assembly 110 may include any number and/or type(s) of optical elements for imaging target objects onto the surface 120 of the image sensor 105. In embodiments, the lens assembly 110 includes one or more lenses (e.g., aspheric lenses, glass lenses, variable focus lenses, etc.) one of which is designated at reference numeral 130, filters (e.g., spatial filters, optical filters, apertures, bandpass filters, highpass filters, lowpass filters, notch filters, chromatic filters, neutral density filters, etc.), focus motors, or another component, lens and/or optical element. In embodiments, the lens assembly 110 may be configured to correct or mitigate chromatic dispersion, optical field curvature, coma, chromatic aberrations and/or other optical field distortions. In embodiments, the lens assembly 110 is configured to allow for an image of a target object to be formed as intended on the surface 120 of the image sensor 105.

To capture images of a target object as intended, the image sensor 105 and the lens assembly 110 need to be optically aligned and subsequently held in optical alignment. For example, a defined central imaging axis 135 of the lens assembly 110 and the imaging axis 125 of the image sensor 105 need to be aligned (e.g., be collinear, parallel, etc.). To hold the lens assembly 110 in alignment with the image sensor 105, the example optical assembly 100 of FIG. 1 includes an example lens chassis 140 and an example light transmissive lens assembly holder 145. As shown, the lens chassis 140 encircles the image sensor 105 and is fixedly, mechanically coupled to the PCB 115 with, for example, screws, rivets, solder, adhesive, etc. such that, once assembled, the lens chassis 140 cannot move relative to the image sensor 105. Thus, the lens chassis 140 provides a solid base relative to the image sensor 105 to which the lens assembly 110 can be held in a fixed optical alignment with the image sensor 105.

The lens assembly holder 145 is configured to fixedly receive the lens assembly 110 to form a lens sub-assembly 150. Once the lens sub-assembly 150 is formed, the lens assembly 110 cannot move relative to the lens assembly holder 145. For example, the lens assembly 110 may be press fit with an applied force into the lens assembly holder 145. Additionally and/or alternatively, the lens assembly 110 may be secured in the lens assembly holder 145 using, for example, adhesive and/or mechanical fastener(s). Additionally and/or alternatively, the lens assembly 110 may be threadably inserted into the lens assembly holder 145. The lens assembly holder 145 is formed of a light transmissive material, that is, a material (e.g., clear plastic) through which light can pass substantially unimpeded.

In the illustrated example, the lens assembly holder 145 or, more generally, the lens sub-assembly 150 is fixedly affixed to the lens chassis 140 with a bead of light-curable adhesive 155. Once the bead of adhesive 155 is cured, the lens sub-assembly 150 is fixedly affixed to the lens chassis 140 and, thus, the lens assembly 110 becomes held in a fixed optical alignment with the image sensor 105.

During manufacture, before the bead of adhesive 155 is cured, the position of the lens sub-assembly 150 can be adjusted relative to the lens chassis 140 to align the lens assembly 110 with the image sensor 105 using, for example, an active alignment process. Using any number and/or type(s) of algorithm(s), method(s), process(es), etc., active alignment dynamically adjusts the position of the lens sub-assembly 150 relative to the lens chassis 140 based on actual image frames being captured by the image sensor 105. Images are captured by the image sensor 105 and analyzed while the position of the lens sub-assembly 150 is dynamically adjusted relative to the image sensor 105 (e.g., in five or six degrees of freedom) until captured image frames reflect that the lens assembly 110 is optically aligned with the image sensor 105, e.g., images that are in focus and properly centered. During active alignment, the lens sub-assembly 150 is held and moved by an active alignment test fixture that includes, for example, a high precision hexapod.

Once optical alignment of the lens assembly 110 and image sensor 105 is achieved, the active alignment test fixture holds the lens sub-assembly 150 steady while light (e.g., UV light) is shined on the optical assembly 100 to substantially cure the bead of light-curable adhesive 155. Because the lens assembly holder 145 is formed of a light transmissive material, the light can pass through the lens assembly holder 145 and substantially cure the bead of light-curable adhesive 155. For example, the bead of adhesive 155 can be cured solely with light, without any heat being applied, to any desired, designed, intended, etc. extent. For example, fully cured, durably cured, cured to an extent that the holding power of the bead of adhesive 155 satisfies an intended final holding power, cured to an extent that additional curing is not required to ensure the long term mechanical and optical stability of the optical assembly 100, cured to an extent that the optical assembly 100 can be considered finally assembled, cured to an extent that the optical assembly 100 is durable for its intended use, etc. Once, the bead of adhesive 155 is substantially cured, the lens sub-assembly 150 is fixedly mounted to the lens chassis 140, the active alignment test fixture can release the lens assembly holder 145, and the lens assembly 110 will remain durably or fixedly aligned with the image sensor 105.

Because the example lens assembly holder 145 is formed of a light transmissive material, extraneous light may reach the image sensor 105 via the lens assembly holder 145 at an end 160 of the lens assembly 110 and/or via a path 180 between the lens assembly holder 145 and the lens chassis 140. Thus, in disclosed examples, a light baffle 165 made of an opaque material having a first end 170 and a second end 175 may be used to help prevent extraneous light from reaching the image sensor 105 via the lens assembly holder 145 and/or the path 180. In some examples, the first end 170 extends to and seals against and around the perimeter of the end 160 of the lens assembly 110. Alternatively, as shown in FIG. 1, the first end 170 need only far enough to form a torturous path for light that enters via the lens assembly holder 145 and/or the path 180. Most light that enters via the lens assembly holder 145 and/or the path 180 will do so at an angle that causes the light to bounce between the lens assembly holder 145 and the lens chassis 140, and then enter the cavity formed by the lens chassis 140 at an angle that results in the light falling incident upon and, thus being blocked by, the light baffle 165. The second opposite end 175 of the light baffle 165 is mounted to (e.g., adhered to) and seals against the PCB 115 around the image sensor 105. In some examples, the light baffle 165 is formed of a rubber or other flexible material. The light baffle 165 may additionally prevent dust from collecting on the image sensor 105.

As shown in FIG. 2, the lens chassis 140 may have two openings to support two side-by-side optical assemblies for, for instance, three-dimensional (3D) vision for a machine vision system.

Figures 4A, 4B, 4C:
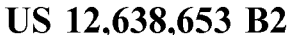
FIGS. 4A, 4B and 4C are exploded perspective views demonstrating an example assembling of the optical assembly of FIGS. 1 and 2, in accordance with the example flowchart of FIG. 3.

A flowchart 300 representative of example processes, methods, software, computer- or machine-readable instructions, etc. for controlling an assembly line and/or manufacturing equipment (e.g., assembly line 510 of FIG. 5) to assemble an optical assembly, such as the example optical assembly 100 of FIGS. 1 and 2, is shown in FIG. 3. FIGS. 4A, 4B and 4C are exploded perspective views demonstrating an example assembling of an optical assembly in accordance with the example flowchart 300 of FIG. 3. The processes, methods, software and instructions may be an executable program or portion of an executable program for execution by one or more processors, such as the processor 502 of FIG. 5. The program may be embodied in software or instructions stored on a non-transitory computer- or machine-readable storage medium such as a compact disc (CD), a hard drive, a digital versatile disk (DVD), a Blu-ray disk, a cache, a flash memory, a read-only memory (ROM), a random access memory (RAM), or any other storage device or storage disk associated with the processor 502 in which information is stored for any duration (e.g., for extended time periods, permanently, for brief instances, for temporarily buffering, and/or for caching of the information). Further, although the example program is described with reference to the flowchart illustrated in FIG. 3, many other methods of assembling the example optical assembly 100 of FIGS. 1 and 2 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an application specific integrated circuit (ASIC), a programmable logic device (PLD), an FPGA, a field programmable logic device (FPLD), a logic circuit, etc.) structured to perform the corresponding operation without executing software or instructions.

The example flowchart 300 of FIG. 3 begins with a PCB 405 (e.g., the PCB 115) having an image sensor 410 (e.g., the image sensor 105) soldered thereon, a light baffle 415 (e.g., the light baffle 165), a lens chassis 420 (e.g., the lens chassis 140), a lens assembly 425 (e.g., the lens assembly 110) and a lens assembly holder 430 (e.g., the lens assembly holder 145) as shown in FIG. 4A. The light baffle 415 is placed inside the lens chassis 420 (block 305) and the lens chassis 420 with the light baffle 415 inside is mounted to the PCB 405 around the image sensor 410 (block 310), as shown in FIG. 4B. The lens assembly 425 is fit into the lens assembly holder 430 to form a lens sub-assembly 435 (block 315), as also shown in FIG. 4B.

Figure 5:
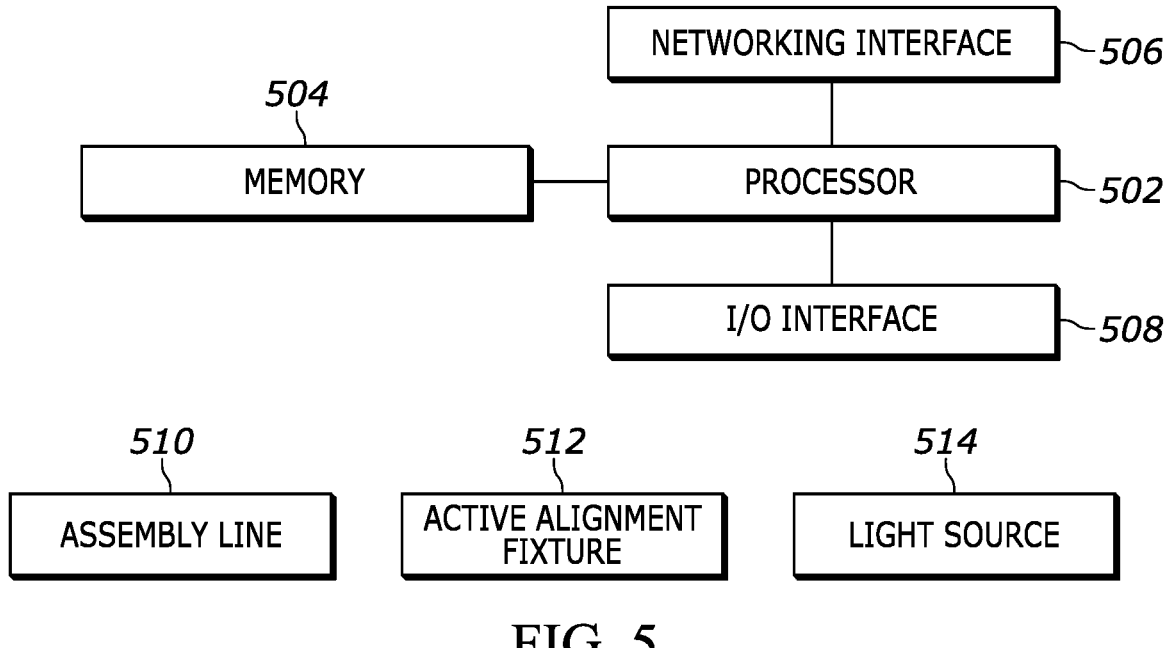
FIG. 5 is a block diagram of an example logic circuit for controlling the assembly of optical assemblies, in accordance with this disclosure.

The PCB 405 with the mounted lens chassis 420 and the lens sub-assembly 435 are placed in an active alignment fixture (block 320) (e.g., active alignment fixture 512 of FIG. 5). Light-curable adhesive is dispensed on the lens chassis 420 (block 325) and the active alignment fixture optically aligns the lens sub-assembly 435 with the image sensor 410 based on image frames captured by the image sensor 410 (block 330). After optical alignment (block 330), one or more light sources (e.g., a light source 514 of FIGS. 1 and 5) is activated to shine light 190 (e.g., UV light) on the lens sub-assembly 435 to substantially cure the light-curable adhesive (block 335). The light 190 emitted by the light source may pass through the lens assembly holder 430 (e.g., the lens assembly holder 145) and/or the gap 180 on to the light-curable adhesive (e.g., the adhesive 155). Once the adhesive is substantially cured by the light 190 (block 335), as shown in FIG. 4C, the PCB 405 with the fixedly mounted lens sub-assembly 435 can be removed from the fixture (block 340), and assembly of a device including the optical assembly of FIG. 4C can continue.

FIG. 5 is a block diagram representative of a logic circuit in the form of an example processing platform 500 that may be used to carry out the example flowchart 300 of FIG. 3 to assemble an optical assembly, in accordance with this disclosure. The processing platform 500 is capable of executing instructions to, for example, implement operations of the example methods described herein. Other example logic circuits capable of, for example, implementing operations of the example methods described herein include FPGAs and ASICs.

The example processing platform 500 of FIG. 5 includes a processor 502 such as, for example, one or more microprocessors, controllers, and/or any suitable type of processor. The example processing platform 500 of FIG. 5 includes any number or types of non-transitory memory 504 (e.g., volatile memory, non-volatile memory, etc.) and/or storage devices accessible by the processor 502 (e.g., via a memory controller) in which information may be stored for any duration (e.g., permanently, for an extended time period, for a brief instance, for temporarily buffering, for caching of the information, etc.). The example processor 502 interacts with the memory 504 to obtain, for example, computer- or machine-readable instructions stored in the memory 504 corresponding to, for example, the operations disclosed herein. Additionally or alternatively, computer- or machine-readable instructions corresponding to the example operations described herein may be stored on one or more removable media (e.g., an optical storage drive, a CD, a DVD, a removable flash memory, etc.) that may be coupled to the processing platform 500 to provide access to the computer- or machine-readable instructions stored thereon.

The example processing platform 500 of FIG. 5 also includes a network interface 506 to enable communication with other machines via, for example, one or more networks. The example network interface 506 includes any suitable type of communication interface(s) (e.g., wired and/or wireless interfaces) configured to operate in accordance with any suitable protocol(s) like, for example, a TCP/IP interface, a Wi-Fi™ transceiver (according to the IEEE 802.11 family of standards), an Ethernet transceiver, a cellular network radio, a satellite network radio, or any other suitable communication protocols or standards.

The example processing platform 500 of FIG. 5 also includes input/output (I/O) interfaces, circuits, components 508 to enable control of, for example, equipment of the assembly line 510, the active alignment fixture 512, the light source 514, etc. Additionally and/or alternatively, they may be controlled via the network interface 506. The I/O interfaces, circuits, components 508 may, additionally and/or alternatively, enable the processor 502 to communicate with peripheral I/O devices. Example I/O interfaces, circuits, components 508 include the display 126, the trigger button 124, a universal serial bus (USB) interface, a Bluetooth® interface, an NFC interface, the RFID radio 128, an RFID antenna, a barcode reader, an accelerometer, a global positioning system (GPS) receiver, an imaging assembly, and/or an infrared transceiver. The peripheral I/O devices may be any desired type of I/O device such as a keyboard, a navigation device (e.g., a mouse, a trackball, a capacitive touch pad, a joystick, etc.), a speaker, a microphone, a printer, a button, etc.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored computer- or machine-readable instructions) to control one or more machines and/or perform operations of one or more machines. Examples of a logic circuit include one or more processors, one or more coprocessors, one or more microprocessors, one or more controllers, one or more DSPs, one or more ASICs, one or more FPGAs, one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes computer- or machine-readable instructions to perform operations (e.g., one or more of the operations described herein and/or represented by the flowcharts of this disclosure, if such are present). Some example logic circuits include a combination of specifically configured hardware and hardware that executes computer- or machine-readable instructions. The above description refers to various operations described herein and/or flowcharts that may be appended hereto to illustrate the flow of those operations. Any such descriptions and/or flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by computer- or machine-readable instructions (e.g., software and/or firmware) stored on a medium (e.g., a tangible computer- or machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and computer- or machine-readable instructions stored on a medium (e.g., a tangible computer- or machine-readable medium) for execution by logic circuit(s).

It will be appreciated that some embodiments may be comprised of one or more generic or specialized processors (or "processing devices") such as microprocessors, digital signal processors, customized processors, FPGAs and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more ASICs, in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk drive (HDD), a compact disc read only memory (CD-ROM), an optical storage device, a magnetic storage device, a ROM, a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, A, B or C refers to any combination or subset of A, B, C such as (1) A alone, (2) B alone, (3) C alone, (4) A with B, (5) A with C, (6) B with C, and (7) A with B and with C. As used herein, the phrase "at least one of A or B" is intended to refer to implementations including any of (1) at least one A, (2) at least one B, and (3) at least one A and at least one B. Similarly, the phrase "at least one of A and B" is intended to refer to implementations including any of (1) at least one A, (2) at least one B, and (3) at least one A and at least one B. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used herein, the expressions "in communication," "coupled" and "connected," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of assembling an optical assembly, the method comprising:
coupling a lens assembly with a lens assembly holder to form a lens sub-assembly;
applying a light-curable adhesive to a lens chassis fixedly mounted to a printed circuit board (PCB);

after applying the light-curable adhesive to the lens chassis, optically aligning the lens sub-assembly with an image sensor fixedly mounted to the PCB; and
when optical alignment is complete, substantially curing the adhesive with light to fixedly mount the lens sub-assembly to the lens chassis to hold the lens assembly in a fixed optical alignment with the image sensor
wherein the lens assembly holder is formed of a light transmissive material, and further comprising passing light external to the lens assembly holder through the lens assembly holder after the optical alignment is complete to cure the light-curable adhesive.

2. The method of claim 1, wherein the light is an ultraviolet light and the lens assembly holder is formed of an ultraviolet light transmissive plastic material.

3. The method of claim 1, wherein coupling the lens assembly with the lens assembly holder includes press fitting the lens assembly at least partially into the lens assembly holder.

4. The method of claim 1, wherein coupling the lens assembly with the lens assembly holder includes threadably inserting the lens assembly at least partially into the lens assembly holder.

5. The method of claim 1, wherein coupling the lens assembly with the lens assembly holder includes adhering the lens assembly to the lens assembly holder.

6. The method of claim 1, further comprising:
soldering the image sensor to the PCB;
mounting a light baffle to the PCB around the image sensor; and
fixedly mounting the lens chassis to the PCB around the light baffle.

7. The method of claim 6, wherein an end of the light baffle opposite the image sensor seals against an end the lens sub-assembly.

8. The method of claim 1, further comprising soldering a controller to the PCB, the controller configured to decode indicia captured in images formed at the image sensor and convey decoded indicia payloads to a host system.

9. An assembly, the assembly comprising
an optical assembly including:
a lens chassis fixedly mounted to a printed circuit board (PCB);
an image sensor fixedly mounted to the PCB;
a lens sub-assembly including a light transmissive lens assembly holder mated with a lens assembly; and
a substantially light-curable adhesive between a surface of the lens chassis and the lens sub-assembly to hold the lens assembly in a fixed optical alignment with the image sensor,
wherein the lens sub-assembly is configured to be optically aligned with the image sensor after an application of the substantially light-curable adhesive to the lens chassis, and
wherein the lens assembly holder is formed of a light transmissive material configured to pass light external to the lens assembly holder through the lens assembly holder after the optical alignment is complete to cure the light-curable adhesive.

10. The assembly of claim 9, wherein the assembly further comprises:
a housing, wherein the optical assembly is positioned at least partially within the housing; and
a barcode decoder disposed in the housing and configured to decode indicia captured in images formed at the image sensor.

11. The assembly of claim 9, wherein the assembly comprises a barcode reader.

12. The assembly of claim 9, wherein the light is ultraviolet light and the lens assembly holder is formed of an ultraviolet light transmissive plastic material.

13. The assembly of claim 9, wherein the lens assembly is press fit at least partially into the lens assembly holder.

14. The assembly of claim 9, wherein the lens assembly is threaded at least partially into the lens assembly holder.

15. The assembly of claim 9, wherein the lens assembly is adhered to the lens assembly holder.

16. The assembly of claim 9, wherein the optical assembly further comprises a light baffle mounted to the PCB around the image sensor, wherein the image sensor is fixedly soldered to the PCB beneath the light baffle, and the lens chassis is fixedly adhered to the PCB around the light baffle.

17. The assembly of claim 16, wherein an end of the light baffle opposite the image sensor seals against an end the lens sub-assembly.

18. The assembly of claim 9, wherein the image sensor includes an interface to communicate images to a controller fixedly soldered to the PCB, the controller configured to decode indicia captured in the images and convey decoded indicia payloads to a host system.

* * * * *